UNITED STATES PATENT OFFICE.

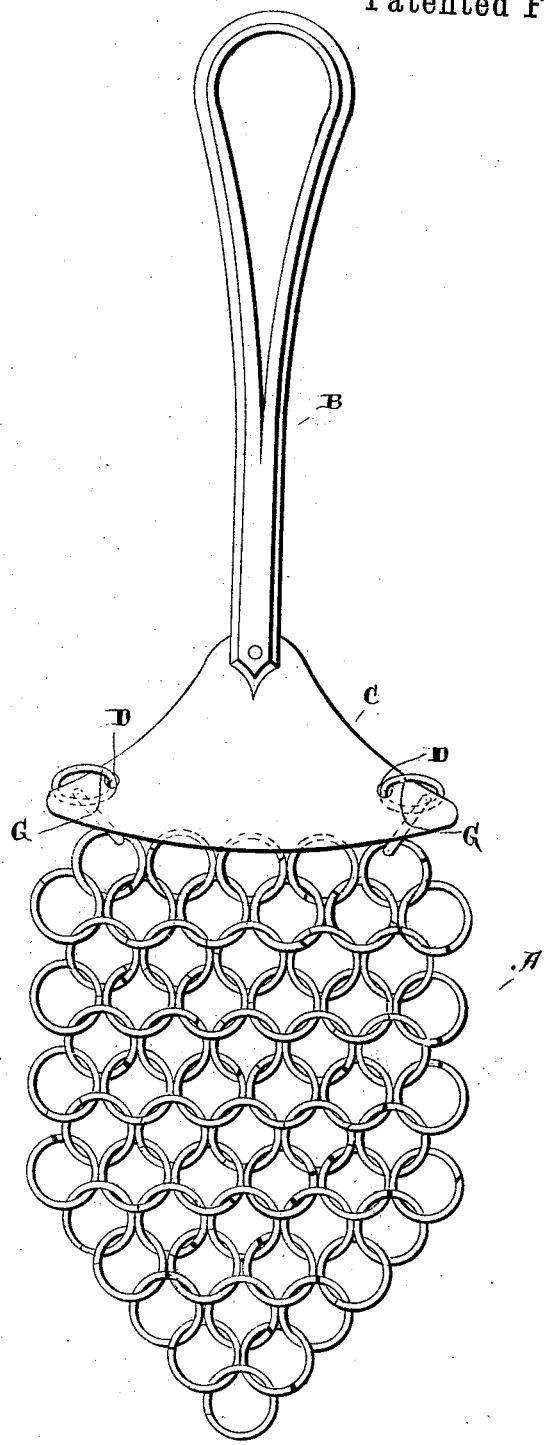

NELSON R. STREETER, OF GROTON, NEW YORK.

COMBINED POT CHAIN AND SCRAPER.

SPECIFICATION forming part of Letters Patent No. 514,840, dated February 13, 1894.

Application filed May 12, 1893. Serial No. 473,898. (No model.)

*To all whom it may concern:*

Be it known that I, NELSON R. STREETER, of Groton, in the county of Tompkins and State of New York, have invented certain new and useful Improvements in a Combined Pot Chain and Scraper; and I do hereby declare the following to be a full, clear, and exact description of the invention, such as will enable others skilled in the art to which it pertains to make and use it, reference being had to the accompanying drawing, which forms part of this specification.

My invention relates to improvements in combined pot chains and scrapers, and it consists in the combination with a pot chain for cleaning the pot, of a knife or scraper which forms also a handle for the chain, and which will be fully described hereinafter and particularly pointed out in the claims.

The object of my invention is to provide a handle for a pot chain which has its lower edge constructed to be adapted to scrape burned or other stubborn substance from the pot, the same being simple and cheap to manufacture, and of great utility in connection with a pot chain.

The accompanying drawing represents a pot chain with my invention applied thereto.

A indicates a pot chain made of the ordinary form and B a handle. Connected to, or formed as a part of the lower end of the handle B, is a widened portion C, which forms a scraper. The lower edge is preferably, though not necessarily, made rounded as shown, and above this scraping edge, are two perforations D, through which the end rings G of the upper portion of the chain are passed. This arrangement leaves the lower edge of the scraper C, entirely free to be used for the purpose of removing burned or other substance from the pot, which would not be easy to remove with the chain alone. This scraper is also capable of being placed upon the chain and the chain rubbed back and forth against the pot under pressure.

While I here show only the two upper end rings of the chain connected to the scraper, which construction I prefer, first, because it leaves the scraping edge of the scraper freer, and secondly, because of simplicity and cheapness in construction.

From the above construction it will be seen that I produce an implement of great utility as compared with a pot chain used alone, and at the same time one which is extremely simple and cheap to construct.

Having thus described my invention, what I claim, and desire to secure by Letters Patent, is—

1. As a new article of manufacture, a combined pot chain and scraper consisting of a handle having a scraper at its inner end, and a chain cloth connected with the said scraper above its scraping edge.

2. A combined pot chain and scraper consisting of a handle having at its inner end a widened portion forming a scraper, the said scraper having perforations above its scraping edge and a chain cloth having its inner end links passed through the said perforations.

In testimony whereof I affix my signature in presence of two witnesses.

NELSON R. STREETER.

Witnesses:
C. T. CONVERSE,
D. H. MARSH.